US008939454B2

(12) United States Patent
Stillinger et al.

(10) Patent No.: US 8,939,454 B2
(45) Date of Patent: Jan. 27, 2015

(54) SCOOTERS AND SCOOTER STEERING SYSTEMS (75) Inventors: Scott H. Stillinger, Monte Sereno, CA (US); Kathryn Kelsey Anne Stillinger, Los Gatos, CA (US)

(73) Assignee: Acorn Products, LLC, Monte Sereno, CA (US)

( * ) Notice: Subject to any disclaimer, the term of this patent is extended or adjusted under 35 U.S.C. 154(b) by 260 days.

(21) Appl. No.: 13/535,657

(22) Filed: Jun. 28, 2012

(65) Prior Publication Data

US 2013/0001909 A1 Jan. 3, 2013

Related U.S. Application Data (60) Provisional application No. 61/503,082, filed on Jun. 30, 2011.

(51) Int. Cl.
*B62K 21/08* (2006.01)
*B62K 3/00* (2006.01)
*B62K 21/00* (2006.01)

(52) U.S. Cl.
CPC ............... *B62K 3/002* (2013.01); *B62K 21/00* (2013.01)
USPC ..................................... 280/87.041; 280/271

(58) Field of Classification Search
CPC ........ B62K 3/002; B62K 21/00; A63C 17/01; A63C 17/012; A63C 17/015
USPC .............. 280/87.01, 87.021, 87.041, 87.05, 280/47.11, 47.131, 209, 267, 268, 270, 271, 280/11.28, 263, 5.509; 482/51
See application file for complete search history.

(56) References Cited

U.S. PATENT DOCUMENTS

| 576,566 | A | * | 2/1897 | Foehl | 280/279 |
| 600,046 | A | * | 3/1898 | Sparks | 280/271 |
| 606,525 | A | * | 6/1898 | Dunning | 280/271 |
| 940,783 | A | * | 11/1909 | Buckland | 280/271 |
| 2,051,762 | A | * | 8/1936 | Vincent | 280/87.041 |
| 2,953,389 | A | | 9/1960 | Green et al. | |
| 2,955,839 | A | * | 10/1960 | Paul | 280/87.021 |
| 3,288,251 | A | | 11/1966 | Sakwa | |
| 3,385,608 | A | | 5/1968 | Waddell | |
| 3,442,528 | A | * | 5/1969 | Rademacher | 280/87.041 |
| 3,862,763 | A | | 1/1975 | Ware | |
| 3,945,655 | A | | 3/1976 | Banks et al. | |
| 3,992,029 | A | * | 11/1976 | Washizawa et al. | 280/221 |
| 4,003,582 | A | | 1/1977 | Maurer | |

(Continued)

OTHER PUBLICATIONS

Razor Carvr Owner's Manual, pp. 1-6, copyright 2007.

*Primary Examiner* — Brodie Follman
(74) *Attorney, Agent, or Firm* — Dascenzo Intellectual Property Law, P.C.

(57) ABSTRACT

Scooters including a body having a rider platform, a rear wheel, and a front wheel pivotally supported by the body about a steering axis. In some scooters, the axle of the front wheel is positioned rearward of the steering axis, and in some scooters the steering axis extends upwardly and divergently away from the rider platform. Some scooters include a steering stabilizer configured to bias the front wheel toward a neutral, or straight, steering configuration. Some scooters include a steering stabilizer that is configured to dampening the pivoting of the front wheel and/or limit an angle of pivot of the front wheel. Some scooters include a rear truck. Some scooters include a rider platform that extends beneath, or closer to a ground surface, than the tops of the scooters' front and/or rear wheels.

22 Claims, 4 Drawing Sheets (56) References Cited

U.S. PATENT DOCUMENTS

| | | | |
|---|---|---|---|
| 4,027,890 A | 6/1977 | Volkmann | |
| 4,037,852 A | 7/1977 | Bayer et al. | |
| 4,055,234 A | 10/1977 | Burton | |
| 4,084,831 A | 4/1978 | Akonteh et al. | |
| 4,166,519 A | 9/1979 | Maloney | |
| 4,166,629 A | 9/1979 | List | |
| 4,295,547 A | 10/1981 | Dungan | |
| 4,394,029 A * | 7/1983 | Holmgren | 280/11.223 |
| 4,674,761 A * | 6/1987 | Kassai | 280/271 |
| 4,714,261 A * | 12/1987 | Kassai | 280/7.1 |
| 4,775,162 A | 10/1988 | Chao | |
| 4,951,958 A | 8/1990 | Chao | |
| 5,263,725 A | 11/1993 | Gesmer et al. | |
| 5,279,181 A * | 1/1994 | Boudreau | 74/551.1 |
| 5,927,740 A * | 7/1999 | Hopey | 280/272 |
| 6,082,754 A * | 7/2000 | Jeunet et al. | 280/272 |
| 6,139,035 A | 10/2000 | Tsai | |
| 6,142,493 A * | 11/2000 | Wang et al. | 280/87.041 |
| 6,213,484 B1 | 4/2001 | Rohner | |
| 6,286,843 B1 * | 9/2001 | Lin | 280/11.28 |
| 6,378,884 B1 * | 4/2002 | Kettler | 280/279 |
| 6,398,238 B1 | 6/2002 | Shaw | |
| 6,409,191 B1 | 6/2002 | Wang et al. | |
| 6,431,567 B2 | 8/2002 | Tsai | |
| 6,481,728 B2 | 11/2002 | Chen | |
| 6,481,729 B2 | 11/2002 | Herman et al. | |
| 6,488,296 B2 | 12/2002 | Ireton | |
| 6,494,470 B2 * | 12/2002 | Chang | 280/87.041 |
| 6,520,517 B1 * | 2/2003 | Chung et al. | 280/87.042 |
| 6,572,130 B2 * | 6/2003 | Greene et al. | 280/266 |
| 6,619,678 B2 * | 9/2003 | van Ardenne | 280/87.041 |
| 6,669,215 B2 * | 12/2003 | Laporte | 280/87.042 |
| 6,758,789 B1 * | 7/2004 | Wang et al. | 482/51 |
| 7,083,177 B1 * | 8/2006 | Chen | 280/87.041 |
| 7,156,408 B2 * | 1/2007 | Kettler et al. | 280/279 |
| 7,226,081 B2 * | 6/2007 | Chen | 280/771 |
| 7,243,931 B2 * | 7/2007 | Chen | 280/87.042 |
| 7,303,199 B2 | 12/2007 | Chen | |
| 7,344,144 B2 * | 3/2008 | Lin | 280/47.34 |
| 7,597,333 B2 * | 10/2009 | Stillinger | 280/87.041 |
| 8,201,840 B2 * | 6/2012 | Kettler et al. | 280/279 |
| 8,342,546 B2 * | 1/2013 | Bryant | 280/87.041 |
| 8,511,701 B2 * | 8/2013 | Kettler et al. | 280/279 |
| 8,632,084 B2 * | 1/2014 | Lovley et al. | 280/87.041 |
| 8,696,000 B1 * | 4/2014 | Chen | 280/87.041 |
| 2001/0030404 A1 | 10/2001 | Liu | |
| 2002/0089139 A1 * | 7/2002 | Reynolds et al. | 280/87.041 |
| 2002/0109323 A1 | 8/2002 | Darnell | |
| 2002/0130482 A1 * | 9/2002 | Jang | 280/244 |
| 2003/0034622 A1 * | 2/2003 | van Ardenne | 280/87.05 |
| 2004/0100053 A1 * | 5/2004 | Chen | 280/87.041 |
| 2005/0093261 A1 | 5/2005 | Liao et al. | |
| 2005/0140108 A1 * | 6/2005 | Chen | 280/87.041 |
| 2005/0230930 A1 | 10/2005 | Chung | |
| 2006/0192358 A1 * | 8/2006 | Chen | 280/93.512 |
| 2007/0096424 A1 * | 5/2007 | Chen | 280/272 |
| 2007/0182123 A1 * | 8/2007 | Bryant | 280/271 |
| 2007/0235970 A1 * | 10/2007 | Stillinger | 280/87.041 |
| 2008/0197594 A1 * | 8/2008 | Ling | 280/87.041 |
| 2009/0212519 A1 * | 8/2009 | Chen et al. | 280/87.01 |
| 2010/0059956 A1 * | 3/2010 | Stillinger | 280/87.041 |
| 2013/0001909 A1 * | 1/2013 | Stillinger et al. | 280/87.041 |
| 2014/0042717 A1 * | 2/2014 | Chan | 280/5.509 |

* cited by examiner

SCOOTERS AND SCOOTER STEERING SYSTEMS

RELATED APPLICATION

This application is based on and claims priority under 35 U.S.C. §119 to U.S. Provisional Patent Application Ser. No. 61/503,082, which was filed on Jun. 30, 2011, is entitled "SCOOTERS AND SCOOTER STEERING SYSTEMS," and the disclosure of which is hereby incorporated by reference.

FIELD OF THE DISCLOSURE

The present disclosure is directed to scooters.

BACKGROUND OF THE DISCLOSURE

A variety of recreational, rider-propelled wheeled vehicles are known, including skateboards and scooters. Scooters are vehicles that typically include a rider platform, or deck, on which a rider may stand with one or two feet; front and rear wheel assemblies that each include at least one wheel; and a steering shaft that is connected to one or more front wheels to convey steering inputs from the rider to the front wheel assembly. Many scooters are rider-powered devices, in which a rider, or user, propels the scooter along a ground surface by pushing or kicking against the ground surface with one of the rider's feet, with the other foot being used to support the rider on the rider platform of the scooter.

To steer a typical conventional scooter, the rider rotates the scooter's steering shaft about its longitudinal axis to steer, or orient, the scooter's front wheel(s) in the desired direction of travel. In some conventional scooters, the scooter is steered by pushing, or pivoting, the scooter's steering shaft in the desired direction of movement, with this pushing, or pivoting, movement orienting the scooter to travel in the selected direction. In some conventional scooters, at least a set of front or rear wheels are mounted on a truck, which is coupled to the rider platform, typically on or adjacent the underside thereof. Such a scooter may be steered by the rider leaning or shifting the rider's weight laterally to tip or pivot the rider platform relative to its long axis, thereby imparting steering forces to the wheels of the truck to steer the scooter.

Many conventional scooters are configured, such as via the orientation and/or construction of the scooter's steering assembly and/or front wheel assembly, to assist the rider in steering the scooter by creating turning, or steering, forces that urge the scooter toward a greater steering, or turning, angle. Such a configuration may be helpful to assist riders achieve a desired steering angle and/or to achieve such a steering angle with less required force applied by the user. However, these steering forces, when present, also oppose restoring, or stabilizing, forces that urge the steering assembly to a neutral, or forward, steering configuration.

SUMMARY OF THE DISCLOSURE

Scooters according to the present disclosure include a body having a rider platform configured for a rider to stand on, at least one rear wheel, and at least one front wheel. The at least one front wheel is pivotally supported by the body about a steering axis. Some embodiments of scooters include an upwardly extending steering shaft that is positioned for a rider to grasp with the rider's hands. In some such embodiments, the steering shaft is coupled to the front wheel and is configured to rotate, or pivot, relative to the body about the steering axis, such as responsive to steering inputs thereto from a rider standing on the rider platform during use of the scooter. In other embodiments, the upright steering shaft is fixed relative to the body. In some embodiments, the steering shaft, and/or the longitudinal axis defined thereby, extends normal to the rider platform, whereas in other embodiments the shaft and/or axis extends at an angle that projects upward and forward of the rider platform. Some embodiments of scooters include a steering stabilizer that is configured to bias the at least one front wheel toward a neutral (i.e., straight) steering position, which additionally or alternatively may be referred to as a neutral steering configuration. In some embodiments, the steering stabilizer is additionally or alternatively configured to dampen the pivoting of the at least one front wheel about the steering axis. Still further additionally or alternatively, in some embodiments, the steering stabilizer is further configured to limit an angle of pivot of the at least one front wheel relative to the neutral steering position. In some embodiments, the rider platform is positioned at least partially, and optionally completely, between the at least one front wheel and the at least one rear wheel, that is, lower than the level of the tops of the wheels. Some embodiments of scooters according to the present disclosure include a rear truck. In some embodiments of scooters according to the present disclosure, the axis of rotation, or axle, of the at least one front wheel is positioned rearward of the steering axis. In some embodiments, the scooter is configured to be steered by a rider by at least one, at least two, and/or all three of pivoting the steering shaft, pushing the steering shaft without rotating the shaft about its axis, and leaning to tilt the rider platform about its longitudinal axis. Scooters according to the present disclosure may provide increased stability compared to conventional scooters, with some scooters according to the present disclosure being configured and/or biased to provide stabilizing, dampening, and/or righting (i.e., to return for a forward steering direction) forces to the scooter during use.

DETAILED DESCRIPTION AND BEST MODE OF THE DISCLOSURE

Figure 1:
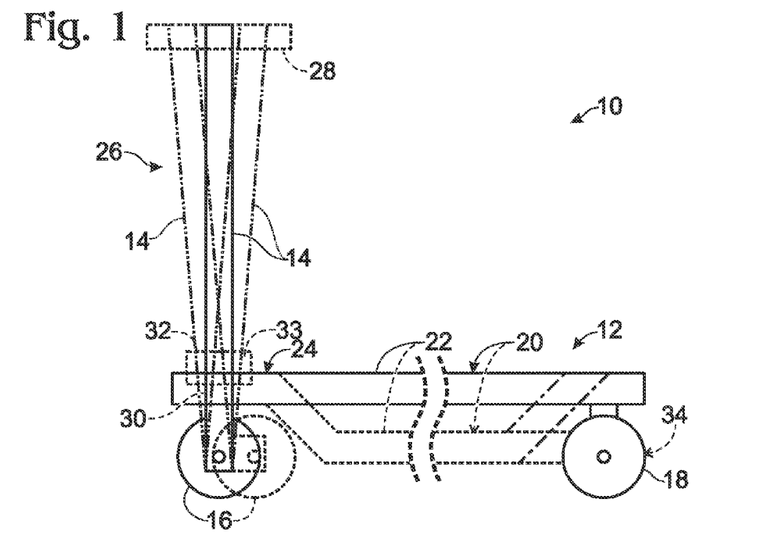
FIG. 1 is a schematic diagram depicting scooters according to the present disclosure.

Scooters according to the present disclosure are schematically illustrated in FIG. 1 and are generally indicated at 10. As schematically illustrated in FIG. 1, scooters 10 according to the present disclosure may include at least a body 12 with a rider platform 20, a steering assembly 26 with a steering shaft 14, one or more front wheels 16, and one or more rear wheels 18. Although not required to all embodiments of scooters 10 within the scope of the present disclosure, the one or more front wheels 16 may be rotatingly coupled to the steering shaft, and the one or more rear wheels 18 may be rotatingly coupled to the body of the scooter. By "rotatingly coupled to," it is meant that the wheels are coupled or otherwise mounted for rotation relative to the steering shaft and/or body, such as during ground-travelling (i.e., rolling) movement of the scooter along a ground surface. As used herein, the one or more front wheels and the one or more rear wheels may be referred to herein as, and/or as forming a portion of, a front wheel assembly and a rear wheel assembly, respectively. The front and rear wheel assemblies may include other components without departing from the scope of the present disclosure. As an illustrative, non-exclusive example, the front and/or rear wheel assemblies may include structure to support and/or operatively couple the corresponding front or rear wheel(s) to, or relative to, the steering shaft 14 and/or the scooter body 12.

In FIG. 1, some illustrated structure of the scooter is depicted in broken (dashed, dash-dot, and/or dash-double-dot) lines. This presentation schematically indicates that the corresponding structure may be optional and/or may correspond to an optional embodiment of a scooter 10 according to the present disclosure. That said, this is not intended to imply, much less dictate, that all structure shown in solid lines in the figures is required to all scooters 10 according to the present disclosure, and FIG. 1 schematically represents various and differing examples of scooters 10 according to the present disclosure.

Scooters 10 are designed to be ridden by a rider, or user. In use, the rider stands on the rider platform and uses one of the rider's feet to kick, or pump, against the ground surface adjacent to the scooter to propel the scooter and the rider along the ground surface. In view of this conventional, but not exclusive, rider-powered mechanism for propelling the scooter, scooter 10 may be referred to as a kick scooter 10 and/or a manual scooter 10.

Scooters 10 according to the present disclosure may be sized and shaped for use by a variety of different riders. For example, when a scooter 10 is sized for use by a child rider, the scooter may be referred to as a children's scooter. It also is within the scope of the present disclosure that scooters 10 may be sized and shaped for use by adults or other older and/or larger riders. Although riders of scooter 10 likely will use the scooter for recreational, sporting, and/or commuting purposes, scooters 10 may be used for a variety of purposes without departing from the scope of the present disclosure.

As used herein, relative positional terms such as front, rear, forward, rearward, up, down, above, below, left, right, top, bottom, and the like are used in the context of a scooter 10 according to the present disclosure being positioned in an upright orientation on a horizontal ground surface. Moreover, the primary direction associated with typical use of a scooter is a forward direction, although scooters 10 also may be ridden backwards or in reverse direction, such as when performing freestyle maneuvers or tricks.

Body 12 of a scooter 10 according to the present disclosure includes a rider platform 20, which may be referred to herein simply as a platform 20, and which is configured to support the rider during use of the scooter. Platform 20 additionally or alternatively may be referred to as a board, deck, body member, rider platform, and/or rider support. Platform 20 has an upper surface 22 that is sized, shaped, and/or otherwise configured for a rider to stand upon with at least one of the rider's feet during use of the scooter. Body 12 and platform 20 according to the present disclosure may be constructed of any suitable material or combination of materials, including (but not limited to) one or more of metal, plastic, and wood. It is within the scope of the present disclosure that portions of the body may be constructed of a different material than the platform portion of the body.

Although not required, the upper surface 22 of platform 20 may be sized to be large enough to receive both of a rider's feet simultaneously. By this it is meant that the platform may be sized and/or shaped so that both of a rider's feet may be supported directly (and/or completely) on the upper surface of the platform during use of the scooter. For example, when a rider is coasting, both feet may be separately supported on the upper surface of the rider platform. When the rider is accelerating or otherwise propelling the scooter, one of the rider's feet will remain on the upper surface of the platform, while the other foot is used to push, or kick, against the ground surface to apply motive forces to the scooter relative to the ground surface. Although a rider platform of a scooter 10 may be sized to simultaneously and independently support both of a rider's feet, it is also within the scope of the present disclosure that a body 12 may include a platform 20 that is sized and shaped to receive only a single foot of a rider at any given time.

Body 12 may include any number of portions, components, or parts and therefore may additionally or alternatively be described as, or as defining, a body assembly 12 of two or more interconnected portions, components, and/or parts. For example, body 12 may include a connecting member 24 that operatively couples, or otherwise connects, the platform 20 to the steering shaft 14 of the scooter. Although not required to all embodiments, connecting member 24 may include, and/or form or define, a head, or head tube, 30 that connects the body to the steering shaft and enables relative movement therebetween, such as when a rider pivots, rotates, or otherwise uses the steering assembly to steer the scooter. However, it is also within the scope of the present disclosure that some scooters 10 may include a steering assembly with a steering shaft that is not pivotal about its longitudinal axis relative to the body of the scooter. Such a steering shaft may be referred to as a fixed steering shaft. Accordingly, it follows that such scooters will utilize a mechanism other than pivoting of the steering shaft to steer the scooter. For example, such scooters may rely on a user leaning to the side and thus leaning the scooter body to the left to turn left and to the right to turn right. In some such examples, the front wheel(s) 16 may be pivotally supported about a pivot axis relative to the scooter body and/or the steering shaft. Such a pivot axis is generally vertical and may or may not be collinear with, or at least parallel to, a longitudinal axis and/or axis of rotation of a rotatable steering shaft, when present. The axis of rotation of a rotatable/pivotal steering shaft and/or the pivot axis of the front wheel(s) additionally or alternatively may be described as the steering axis of a scooter 10.

Other portions, or components, of a body assembly 12 are within the scope of the present disclosure, including (but not limited to) brackets, fasteners, guards/reinforcements, and grip structure that is configured to provide a frictional engagement between a rider's feet (or footwear) and upper surface 22.

As discussed, some scooters 10 according to the present disclosure include a steering assembly 26, with the steering shaft 14 being a component of the steering assembly. Steering shaft 14 additionally or alternatively may be referred to as a steering column 14. As schematically illustrated in FIG. 1, steering assembly 26 may (but is not required to) include an optional gripping member 28 distal the portion of the steering assembly that is connected to the body of the scooter (and/or distal the ground surface upon which the scooter travels during use). Gripping member 28 may take any suitable form or configuration that is suitable for a rider to grasp with at least one of the rider's hands while operating scooter 10. Illustrative, non-exclusive examples of suitable gripping members include handlebars, handles, hand grips, steering knobs, and the like. When present, gripping member 28 typically will project at least laterally away from the upper portion of the steering shaft, such as to have a T-shaped configuration, although this construction is not required to all embodiments.

In FIG. 1, steering shaft 14 is schematically illustrated in solid lines as being, or extending, in a vertical (or upright) orientation relative to a ground surface upon which the scooter is positioned. It is within the scope of the present disclosure, however, that the steering shaft may be vertical or otherwise perpendicular (or at least approximately perpendicular) relative to a flat ground surface when the scooter is positioned with all of its wheels on the ground surface and/or relative to the upper surface 22 of platform 20, or that the steering shaft may be angled forward or rearward relative to a perpendicular position, such as to define a steering axis that extends, or projects, upwardly and divergently forward of (i.e., away from) or rearward of (i.e., over) the rider platform. In dash-double-dot lines in FIG. 1, a steering shaft 14, is shown extending in illustrative, non-exclusive examples of these canted, or angled, orientations relative to the rider platform.

All of these illustrative, non-exclusive optional configurations of steering shafts being described generally as upright orientations. Illustrative, non-exclusive examples of suitable forward or rearward angles relative to a vertical or perpendicular position for steering shafts according to the present disclosure include (but are not limited to) 20, 15, 10, 5, and 0 degrees and angles of 0-20, 0-15, 0-10, 0-5, 5-20, 5-15, 5-10, 10-20, 10-15, and 15-20 degrees. Angles greater than and less than the enumerated values and ranges, as well as other values within the enumerated ranges, are also within the scope of the present disclosure. Additionally or alternatively, while steering shaft 14 of FIG. 1 defines a single longitudinal axis along its length, it is within the scope of the present disclosure that the steering shaft may include one or more bends and/or arcuate portions that have respective longitudinal axes that are not parallel to the primary and/or overall steering axis defined by the steering assembly and/or the front wheel assembly.

In some embodiments, having a steering axis that is canted, or angled, forward of the rider platform (i.e., which defines an angle with rider platform that is greater than 90°, such as an angle of at least 95°, at least 100°, etc.) may provide increased stability to the scooter, especially when the at least one front wheel is offset rearward, or behind, the steering axis, as indicated in dashed lines in FIG. 1. In some such embodiments, during use of the scooter during turns, the weight of the rider standing on the rider platform may create a restoring, or stabilizing, force that biases the steering assembly, and thus the at least one front wheel, to a forward, or neutral, steering configuration. As used herein, references to biasing the scooter, or a portion thereof (such as the steering assembly, steering shaft, and/or at least one front wheel) to a neutral, or forward, steering configuration additionally or alternatively maybe described as creating restoring forces that at least partially oppose, or counteract, steering forces that urge the steering assembly, steering shaft, and/or front wheel assembly in a direction of greater turning.

As discussed, steering shaft 14 may (but is not required to) be coupled rotatingly to body 12 so that a rider, when standing on platform 20, may grasp a portion of the steering assembly, such as the optional gripping member 28, and rotate or otherwise turn the steering shaft about its longitudinal and/or steering axis, thereby pivoting the front wheel(s) 16 about the steering axis. Accordingly, steering shaft 14 may be configured to rotate relative to the head tube 30 and/or body 12 of the scooter responsive to the rider conveying steering inputs to the scooter's steering assembly. As discussed, however, some steering shafts 14 are not rotatable relative to the body of the scooter to convey steering inputs from a rider to the scooter's front and/or rear wheel assemblies. In such embodiments in which the steering shaft is not rotatable relative to the scooter body, the front wheel(s) may be pivotably supported by the scooter body 12, and therefore a user may steer the scooter by leaning to the left or the right or by pushing the fixed steering shaft (when present) to the left or the right.

In scooters 10 in which a steering shaft is configured to be rotated, or pivoted, relative to the body of the scooter to convey steering inputs from the rider to the front wheel assembly, the scooters may additionally or alternatively include a steering stabilizer 32, as schematically illustrated in FIG. 1. In FIG. 1, the steering stabilizer is illustrated at 32 as a dashed box overlapping portions of steering shaft 14, head tube 30, and body 12, with this graphical depiction schematically representing that the steering stabilizer may take any suitable form and may be connected to, may be a component of, and/or may be defined by one or more of the steering shaft, the body, the front wheel assembly, and/or the head tube 30 or other connecting member 24. Steering stabilizer 32, when present, may be formed of one or more components that may independently, collectively, and/or cooperatively increase the stability of scooter 10, as compared to such a scooter that does not include such a steering stabilizer.

When provided, the optional steering stabilizer 32 may be configured to bias the front wheel assembly to a neutral (i.e., straight) steering configuration. Additionally or alternatively, the steering stabilizer, when present, may be configured to restrict the extent of rotation permitted by the steering shaft relative to the body and/or the extent of pivot of the front wheel(s) about the steering axis. Additionally or alternatively, the force required to rotate, or pivot, the steering shaft may increase as the angle of rotation increases up to an angle in which further rotation of the steering shaft is prevented. Additionally or alternatively, in embodiments that do not include a rotatable steering shaft, a steering stabilizer may be configured to restrict the extent of pivot permitted by the front wheel(s) 16 relative to the body.

In some embodiments, the steering stabilizer may be described as dampening the steering inputs, and thus dampening and/or at least partially counteracting or opposing the steering forces imparted to turn the front wheel assembly away from a neutral steering position. In some embodiments, and as discussed herein, the steering stabilizer, when utilized, may include a spring, elastomeric member, or other biasing and/or dampening structure that urges the front wheel assembly and/or steering shaft toward a neutral steering configuration. As used herein, steering stabilizer 32 may additionally or alternatively be referred to as a steering dampener, a steering restrictor, and/or a steering biasing mechanism.

As an illustrative, non-exclusive example, an optional steering stabilizer 32 may be configured to restrict rotation of the steering shaft to be within a preselected or preconfigured angle relative to a neutral steering position. Additionally or alternatively, an optional steering stabilizer may be configured to restrict pivoting of the front wheel(s) about the steering axis to be within a preselected or preconfigured angle relative to a neutral steering position. This angle thus may be referred to as a maximum steering angle, as the steering shaft may be rotated left and right and/or the front wheel(s) 16 may be pivoted left and right of the neutral steering position up to the maximum steering angle. As used herein, a neutral steering position refers to a position of the front wheel(s) of the front wheel assembly being positioned for straight movement by the scooter. That is, when the front wheel(s) is/are in a neutral steering position, the direction of rolling of the one or more front wheels is parallel to a longitudinal axis of the body of the scooter. Stated differently, a neutral steering position corresponds to a rider intending to move the scooter in a forward (or reverse), straight direction. Illustrative, non-exclusive examples of suitable angles of restriction, or limitation, as measured from a neutral steering position, include (but are not limited to) angles of 80, 70, 60, 50, 40, 30, 20, and 10 degrees and angles of 10-80, 10-70, 10-60, 10-50, 10-40, 10-30, 10-20, 20-80, 20-70, 20-60, 20-50, 20-40, 20-30, 30-80, 30-70, 30-60, 30-50, 30-40, 40-80, 40-70, 40-60, 40-50, 50-80, 50-70, 50-60, 60-70, 60-80, and 60-70 degrees. In the above illustrative, non-exclusive examples, the ranges represent a range of maximum steering angles in each direction (i.e., pivotal angle to the left of the straight/neutral position and the pivotal angle to the right of the straight/neutral position) that may be permitted by the steering stabilizer relative to the neutral steering position. Accordingly, a steering stabilizer that restricts the steering shaft to pivoting to 80 degrees means that the steering assembly is pivotal within a range of 160 degrees, since the steering assembly may pivot 80 degree to the left of a neutral/straight steering configuration and also 80 degrees to the right of a neutral/straight steering configuration. Angles greater than and less than the enumerated values and ranges, as well as other values within the enumerated ranges, also are within the scope of the present disclosure.

The optional angular restriction of the steering shaft and/or front wheel(s) of a scooter 10 according to the present disclosure may be implemented in any suitable matter. An illustrative, non-exclusive example of a suitable structure for steering stabilizer 32 includes inclusion of a pair of stops, or surfaces, 33 that respectively engage a portion or portions of the steering shaft, the head tube, the front steering assembly, the body, and/or another component of scooter 10 to restrict rotation of the steering shaft and/or pivoting of the front wheel(s) beyond a predetermined relative angle.

As mentioned, it also is within the scope of the present disclosure that a scooter 10 may include a steering shaft 14 that is not rotatingly coupled to body 12 and instead is fixed relative to the body. In such optional embodiments, the one or more front wheels may be pivotally coupled to the steering shaft and/or the body about the steering axis. As illustrative, non-exclusive examples, the one or more front wheels of the front wheel assembly may have a fixed, caster, or truck configuration. Such optional configurations may permit a rider to grasp the steering shaft (and/or associated gripping member 28) and steer the scooter by leaning on platform 20 or by pivoting the steering shaft to the left or right. In such configurations, steering shaft 14 additionally or alternatively may be described as a stability, or stabilization, shaft, a handle, or handlebar, a fixed shaft, an upright shaft, or simply a shaft 14. As mentioned, it is within the scope of the present disclosure that a scooter 10 having a fixed shaft 14, but with a pivotally supported front wheel assembly, may include a steering stabilizer 32 that restricts the pivot angle of the front wheel(s).

It also is within the scope of the present disclosure that the angles of restriction of a steering shaft or front wheel(s) by a steering stabilizer 32 may be adjustable by a rider. In other words, steering stabilizer 32, when present, may be configured to be selectively adjusted by a rider to increase or decrease the maximum steering angle defined by the steering stabilizer. Steering stabilizer 32 also may be configured to be selectively removed and reinstalled by a user, such as to permit a user to select between use of the scooter with and without a steering stabilizer 32. For example, it may be desirable in some situations to restrict the angle of steering to a small angle so as to prevent a rider from making sharp turns, for example, when a rider is engaging in high speed or downhill movement on a scooter 10. Additionally or alternatively, it may be desirable in some situations to permit a greater degree of turning, for example, when a rider is engaging in freestyle maneuvers and/or tricks with a scooter 10. Other reasons for adjusting the angle of restriction also are within the scope of the present disclosure. For example, the angle of steering established by the steering stabilizer may be adjusted responsive to the relative level of skill of the rider. Regardless, when a scooter 10 includes a steering stabilizer 32, the steering stabilizer may be configured to permit the degree of permitted steering angle (i.e., the maximum steering angle) to be adjusted. Additionally or alternatively, more than one steering stabilizer may be provided for interchangeable installation on a scooter 10, with the steering stabilizers defining different maximum steering angles and/or different amounts of dampening.

Steering stabilizer 32 additionally or alternatively may be configured to dampen and/or retard the rotation of the steering shaft and/or pivot of the front wheel(s) relative to the body. By this it is meant that the steering stabilizer may be configured to increase the force required to rotate the steering shaft and/or pivot the front wheel(s) relative to the body, thereby reducing the vibrations and/or oscillating movements (which may be referred to as "wobble" and/or as "speed wobble") that may be imparted at least to the scooter's front wheel assembly during use. For example, younger, less experienced, and/or less strong riders may not be able to grasp and maintain the scooter's handle bar, hand grip(s), and/or other gripping member 28 in a selected steering orientation during use of the scooter. Additionally or alternatively, during ground-traveling movement of the scooter, especially when on uneven surfaces and/or at higher speeds, vibrations and/or oscillations in the front wheel assembly may be reduced or prevented by the steering stabilizer.

As discussed, in some embodiments of scooters 10 according to the present disclosure, the optional steering stabilizer, when present, may be referred to as a steering dampener 32. For example, when steering stabilizer 32 is configured and utilized as a steering dampener and a rider rotates the steering shaft, such as by grasping an optional handlebar associated with the steering shaft, the rider may feel resistance against the turning of the steering shaft, such that the steering shaft is biased toward a neutral steering position. As another example, when a rider rotates the steering shaft to the left or right, the rider may experience resistance against the turning motion, and upon release, or at least upon a reduction in force, of a rider's turning of the steering shaft, the steering shaft may return (or at least may be biased to return) to a neutral steering position. The optional biasing force associated with the steering stabilizer may be configured in any suitable manner, including (but not limited to) a constant biasing force, a linearly increasing biasing force as the angle of turn increases, etc. In some examples, no biasing force may be present within a range of angles relative to the neutral steering position and including the neutral steering position, but a biasing force may be present when the front wheel(s) are at an angle above (i.e., greater than and/or exceeding) a threshold angle relative to the neutral steering position. Additionally or alternatively, in examples of scooters with a fixed shaft, the optional biasing force associated with the steering stabilizer may serve to generally bias the front wheel(s) toward the neutral steering position, thereby stabilizing the scooter.

The optional dampening of the steering of a scooter 10 according to the present disclosure may be implemented in any suitable manner, illustrative, non-exclusive examples of which include use of one or more springs, one or more dampeners, one or more resilient members, one or more compressible members, one or more elastomers, etc. Additionally or alternatively, the optional spring(s), dampener(s), elastomers(s), or other member(s), may define the optional angle of restriction associated with an optional steering stabilizer 32. For example, as an illustrative, non-exclusive example, a resilient member may permit rotation of the steering shaft and/or pivot of the front wheel(s) up to a maximum angle of rotation, or pivot, associated with the resilient member becoming fully compressed, or at least not permitting further compression of the resilient member by a rider either rotating the steering shaft or leaning on the scooter to cause the front wheel(s) to pivot. Other configurations also are within the scope of the present disclosure, including optional configurations that include both of a compressible resilient member and a pair of stops 33, as discussed herein.

It also is within the scope of the present disclosure that the degree, or amount, of dampening or resistance by an optional steering stabilizer may be adjustable by a rider. For example, in some situations a rider selectively may reduce the dampening or resistance against turning of the steering shaft, for example, when a rider is engaging in freestyle maneuvers and/or tricks with a scooter 10. Additionally or alternatively, it may be desirable in some situations to increase the resistance against pivoting of the front wheel(s), for example, when a rider is engaging in high speed or downhill movement on a scooter 10 and/or when a rider is less experienced and would benefit from steering stabilizer 32 regulating the angle and/or degree of steering available to the rider. Other reasons for adjusting the resistance against steering also are within the scope of the present disclosure. Likewise, it also is within the scope of the present disclosure that a steering stabilizer 32 and/or steering dampener 32 may be configured to be selectively removable from a scooter 10. By this it is meant that scooter 10 and/or steering stabilizer/dampener 32 are designed so that the restrictor/dampener may be selectively removed from the scooter and reattached to the scooter without destruction or damage to the scooter or the steering stabilizer/dampener. Moreover and as mentioned, more than one steering stabilizer/dampener may be provided for interchangeable installation on a scooter, with each restrictor/dampener providing a unique maximum angle of rotation/pivot and/or a unique dampening profile.

Still referring to FIG. 1, and as optionally and schematically illustrated in dashed lines, it is within the scope of the present disclosure that in some embodiments of scooters 10, the one or more front wheels 16 may be positioned at least partially behind (i.e., offset behind) the longitudinal axis of the steering shaft 14 and/or the pivot axis of the front wheel(s), at least when the front wheel(s) are in a neutral steering position. Additionally or alternatively, in some embodiments of scooters 10, the axle (and/or the horizontal axis of rotation during forward ground-traveling movement) of the one or more front wheels may be positioned behind the axis of rotation or the longitudinal axis of the steering shaft and/or the pivot axis of the front wheel(s), at least when the front wheel(s) are in a neutral steering position. Described in still another way, in some embodiments of scooters 10, the one or more front wheels 16 of the front wheel assembly may be coupled to the steering assembly such that when the front wheel(s) are in the neutral steering position, the one or more front wheels contact the ground surface rearward of where the axis of rotation (or the longitudinal axis) of the steering shaft and/or the pivot axis of the front wheel(s) intersects the ground surface. Illustrative, non-exclusive examples of suitable distances between the steering axis and the axis/axle of the front wheel(s) and/or where the front wheel(s) intersect the ground surface include distances of at least 1 centimeter (cm), such as distances of at least 1.5 cm, at least 2 cm, at least 2.5 cm, at least 3 cm, at least 4 cm, at least 5 cm, and/or distances in the range of 1-5 cm, 1.5-4.5 cm, 2-4 cm, and 2.5-3.5 cm. Additional illustrative, non-exclusive examples of suitable distances include distances that are at least 10%, at least 20%, at least 25%, at least 30%, at least 40%, at least 50%, at least 75%, and/or at least 100% of the diameter of the front wheel(s) of the front wheel assembly and/or distances in the range of 10-50%, 20-50%, 25-75%, 40-60%, 50-90%, and 60-100% of the diameter of the front wheel(s) of the front wheel assembly.

The above illustrative, non-exclusive configurations for the front wheel(s) of the front wheel assembly, when present, may permit a rider to steer the scooter via the front wheel assembly without rotation of the steering shaft and/or requiring the rider to grasp and rotate the steering assembly's gripping member to convey steering inputs to the front wheel assembly. The reason for this is that the above configurations create a movement, or moment, arm in which lateral (left or right) tilting of the scooter creates forces between the ground surface and the one or more front wheels to urge the front wheel(s) and the steering shaft to pivot away from the direction of lateral tilting due to the created force vector being behind the pivot, or steering, axis. Additionally or alternatively, such a rearwardly offset front wheel assembly (relative to the pivot axis of the front wheel(s)), when utilized, may create a biasing, or restoring, force that urges the front wheel assembly toward its neutral, or straight, steering position. Moreover, the magnitude of this biasing or restoring force may increase as the steering angle of the front wheel assembly is increased. Additionally or alternatively, this front wheel assembly configuration, when implemented, may result in the rider needing to apply a proportionally greater amount of force (whether by tilting the scooter or by rotating a rotatable steering shaft) to increase the steering angle of the front wheel assembly as the steering angle of the front wheel assembly is increased. As an illustrative, non-exclusive example, a user may need to apply a greater force (such as via the steering shaft or simply by leaning on the scooter) to increase the steering angle of the front wheel assembly from 50 to 60 degrees than is required to increase the steering angle from 20 to 30 degrees (relative to a straight (0 degrees) resting, or forward, steering angle).

When utilizing a scooter 10 with such a rearwardly disposed front wheel assembly, a rider may convey steering inputs to the front wheel assembly simply by urging the steering shaft laterally to the left or right (i.e., pushing or pulling the steering shaft to the left or right of its current position without directly imparting rotation of the steering shaft about its steering or longitudinal axis), with this configuration causing the steering shaft and/or the front wheel(s) to responsively turn to the left or right, respectively, despite the rider not directly imparting a turning force to the steering shaft. In other words, when a rider is riding on a scooter and moving in a forward direction with the scooter rolling in a forward direction and the rider pivots the steering shaft to the left and/or leans or tilts the scooter to the left, the configuration of the one or more front wheels being at least partially behind the pivot axis may naturally cause the one or more front wheels to pivot to the right, thereby imparting a left turn to the scooter. Similarly, when the rider pivots the steering shaft to the right and/or leans or tilts the scooter to the right, the configuration of the one or more front wheels being at least partially behind the pivot axis may naturally cause the one or more front wheels to pivot to the left, thereby imparting a right turn.

Moreover, the above-described front wheel assembly orientations additionally or alternatively may permit the scooter to be steered via the front wheel assembly simply by the rider leaning left or right on the rider platform, and thus without requiring the rider to push, pull, rotate, or otherwise physically contact the steering shaft or gripping region of the steering assembly to convey steering inputs to the front wheel assembly. That is, when a rider is standing on upper surface 22 of the rider platform and the scooter is rolling in a forward direction, when the rider leans to the left, the configuration of the one or more front wheels being at least partially behind the steering axis (and/or having the axis/axle of rotation of the front wheel(s) being behind the steering axis and/or having the front wheel(s) contact the ground surface rearward of where the steering axis intersects the ground surface) will naturally cause the one or more front wheels to pivot to the right, thereby imparting a left turn. Similarly, when the rider leans to the right, the configuration of the one or more front wheels being at least partially behind the steering axis will naturally cause the one or more front wheels to pivot to the left, thereby imparting a right turn. Such embodiments of scooters 10 according to the present disclosure may therefore be able to be ridden and steered without the use of the rider's hands and/or without a rider grasping an optional gripping member or engaging the steering shaft or optional steering assembly at all.

Accordingly, a scooter 10 having such an optional configuration with the one or more front wheels being positioned at least partially behind, or rearward, (i.e., offset behind) the steering axis, the scooter may be steered in several different manners, such as by: (1) physically rotating the steering shaft, (2) leaning left or right on the platform, and/or (3) pivoting the steering shaft to a left or right side. The degree, or magnitude, of the steering forces that are imparted to the one or more front wheels of the front wheel assembly will vary at least in part due to the degree to which the front wheel(s) are rearward of the steering axis.

In embodiments of scooters 10 according to the present disclosure that include an optional steering stabilizer 32 and which are configured to permit turning by a rider simply leaning on the platform 20 or laterally pivoting the steering shaft 14, a rider may have to lean beyond a threshold angle to the left or right to overcome the bias of the steering stabilizer, which as discussed, may bias the steering shaft and/or front wheel(s) to a neutral steering position. In other words, the internal bias of the optional steering stabilizer may be sufficient enough to restrict, or even prevent, rotation of the steering shaft and/or pivot of the front wheel(s) as a result of a rider leaning on the platform, unless a rider leans beyond a threshold angle and/or unless the scooter is traveling faster than a threshold speed and thus the ground is imparting greater than a threshold force against the front wheel(s). However, it also is within the scope of the present disclosure that a scooter 10 may be configured such that there is not a, or at least is not a readily detectable, threshold angle (beyond the nominal neutral, or straight-forward, angle) that is required to impart steering forces to the scooter's front wheel assembly. As illustrative, non-exclusive examples associated with typical riding speeds of scooters 10, threshold angles of lean by a rider, below which restrict or prevent rotation of the steering shaft and/or pivot of the front wheel(s), include (but are not limited to) 20, 15, 10, 5, and 0 degrees and angles of 0-20, 0-15, 0-10, 0-5, 5-20, 5-15, 5-10, 10-20, 10-15, and 15-20 degrees. Angles greater than and less than the enumerated values and ranges, as well as other values within the enumerated ranges, are also within the scope of the present disclosure. Illustrative, non-exclusive examples of typical riding speeds include (but are not limited to) speeds of at least 1, at least 2, at least 4, at least 6, at least 8, at least 10, and/or less than 15, less than 10, less than 8, less than 6, less than 4, or less than 2 miles per hour. Speeds greater than, less than, or within the enumerated values and ranges are within the scope of the present disclosure.

As optionally and schematically illustrated in dashed lines in FIG. 1, some embodiments of scooters 10 according to the present disclosure may include a rider platform 20 with an upper surface 22 that at least partially, if not substantially, or even completely, extends below the level at which the body connects to the steering shaft and/or below the uppermost portion of the scooter's front and/or rear wheels. As schematically illustrated in dashed lines in FIG. 1, the rider platform may extend between the front and rear wheels of the scooter such that the forward portion of the rider platform is rearward of the scooter's one or more front wheels and the rearward portion of the rider platform is forward of the scooter's one or more rear wheels. Such a configuration, while not required, particularly may be suitable for a rider engaging in fast, wide turns, which also may be referred to as carving. Regardless of the rider's use of the scooter, having a rider platform with an upper surface that is closer to the ground surface will lower the rider's (and the scooter's) center of gravity compared to when a scooter with a higher rider platform is utilized. Additionally or alternatively, having a rider platform that is closer to the ground surface may reduce rider fatigue (compared to a corresponding scooter with a higher rider platform) because the rider's leg that is supported directly on the rider platform will not need to bend as much to permit the rider's other leg to reach the ground surface to propel the scooter.

In FIG. 1, the optional configurations of body 20 illustrated in dashed and dash-dot lines are schematic and are not intended to limit the various optional configurations of bodies 20 according to the present disclosure. For example, a scooter 10 according to the present disclosure may include a partially lowered body that extends only partially below the level of the top of the front and/or rear wheels, a portion of a body that extends fully below the level of the top of the front and/or rear wheels, a body that extends partially or fully below the level of the top of the front and/or rear wheels toward the front of the scooter and that extends fully above the top of the front and/or rear wheels toward the rear of the scooter, etc. Other configurations also are within the scope of the present disclosure, including configurations in which upper surface 22 is not, or includes portions that are not, generally parallel to a corresponding ground surface upon which a scooter 10 is positioned.

The one or more rear wheels 18 of scooters 10 according to the present disclosure may take any suitable form, including having one wheel, two wheels, or more than two wheels. In some embodiments, two wheels may be coupled to and/or a component of a truck 34, which may be described as a portion of the scooter's rear wheel assembly. Truck 34 permits pivoting of the rear wheels relative to the body 12 and/or rider platform 20, such as responsive to pivoting, or tilting, of the rider platform about its long axis. Illustrative, non-exclusive examples of suitable trucks 34 include skateboard trucks (i.e., trucks that are utilized conventionally for skateboards). Although not required to all embodiments, truck 34 typically will be biased to a neutral (straight) steering configuration and will be configured to dampen the pivoting thereof, such as to provide stability and reduce vibration or oscillation during use. Accordingly, trucks 34 may be described as being dampened and/or as being or providing a dampened rear wheel assembly. Additional illustrative, non-exclusive examples of suitable trucks for scooters 10 are disclosed in U.S. Pat. No. 7,597,333, the disclosure of which is hereby incorporated by reference. When a truck is utilized with a scooter 10, steering of the scooter may at least partially be implemented by a rider leaning or otherwise shifting the rider's weight or pushing with the rider's feet to tilt the rider platform to the left or right.

Although not required to all embodiments, a scooter 10 according to the present disclosure may provide improved stability and/or rideability compared to a conventional scooter when the scooter includes two, or even all three, of (1) the optional front wheel configuration having the one or more front wheels positioned at least partially behind the steering axis, (2) the optional lowered platform configuration, in which at least a portion of the rider platform of the scooter is positioned at least partially between the front and rear wheels, and (3) the optional rear wheel assembly includes a dampened rear wheel assembly, which may be or include a truck. This increased control and stability, such as in the form of a more stable rider and a wider range of steering options, when provided, may be beneficial to both experienced and inexperienced riders.

Turning now to FIGS. 2-8, illustrative, non-exclusive examples of, including portions of, scooters 10 according to the present disclosure are illustrated. Where appropriate, the reference numerals from the schematic illustration of FIG. 1 are used to designate corresponding parts of scooters 10 according to the present disclosure; however, the examples of FIGS. 2-8 are non-exclusive and do not limit the present disclosure to the illustrated embodiments. That is, neither scooters 10, nor various portions thereof, are limited to the specific embodiments disclosed and illustrated in FIGS. 2-8, and scooters 10 according to the present disclosure may incorporate any number of the various aspects, configurations, characteristics, properties, etc. that are illustrated in the embodiments of FIGS. 2-8, in the schematic representations of FIG. 1, as well as variations thereof, without requiring the inclusion of all such aspects, configurations, characteristics, properties, etc. For the purpose of brevity, each previously discussed component, part, portion, aspect, region, etc., or variants thereof, may not be discussed again with respect to FIGS. 2-8; however, it is within the scope of the present disclosure that the previously discussed features, materials, variants, etc. may be utilized with the illustrated embodiments of FIGS. 2-8.

Figure 2:
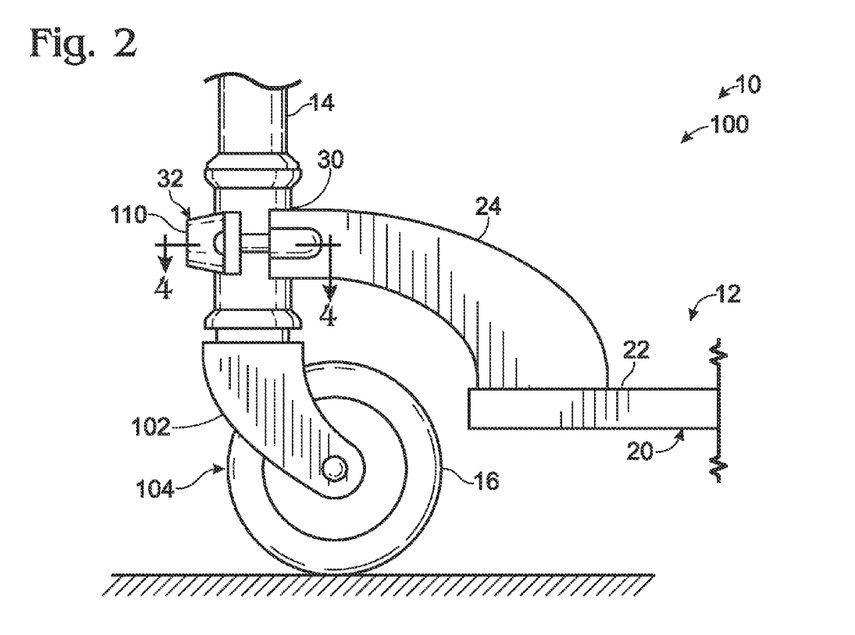
FIG. 2 is a fragmentary side view of a portion of an illustrative, non-exclusive example of a scooter according to the present disclosure.
Figure 3:
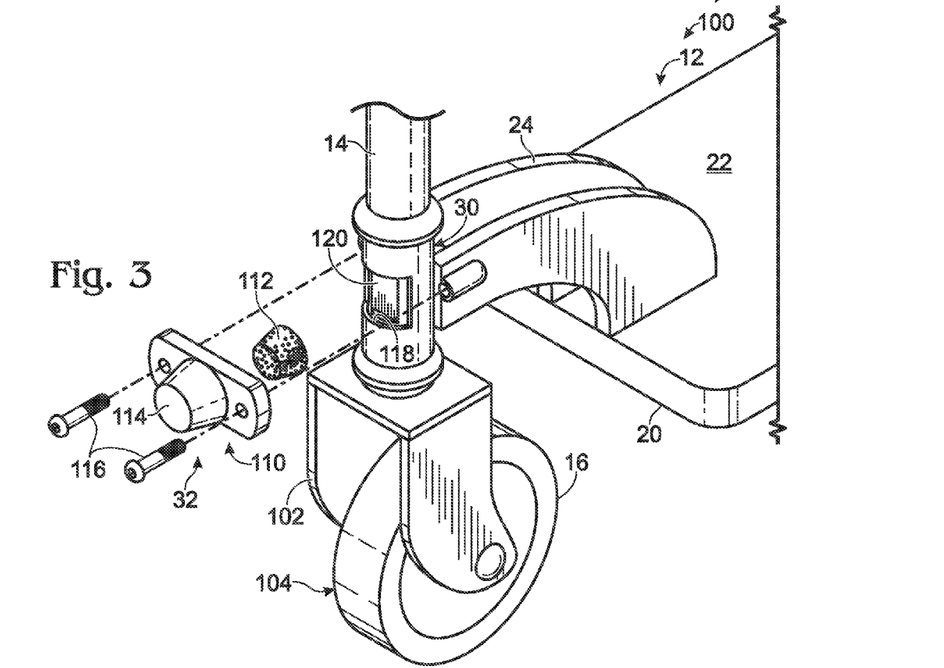
FIG. 3 is a fragmentary exploded isometric view of the scooter of FIG. 2.

Portions of an illustrative, non-exclusive example of a scooter 10 according to the present disclosure are illustrated in FIGS. 2-5, with the scooter indicated generally at 100 in FIGS. 2-3. Scooter 100 is an example of a scooter 10 having a front wheel assembly with a single front wheel 16 having an axis/axle of rotation and a contact point with the ground surface that is positioned behind the axis of rotation of a rotatable steering shaft 14, as perhaps best seen in FIG. 2. The front wheel is connected to the steering shaft via a front fork 102. The steering shaft extends through a head tube 30 so that when the steering shaft rotates, the front wheel pivots with the steering shaft about the steering axis. The front wheel and fork 102 may be described as portions of a front wheel assembly 104.

Figure 4:
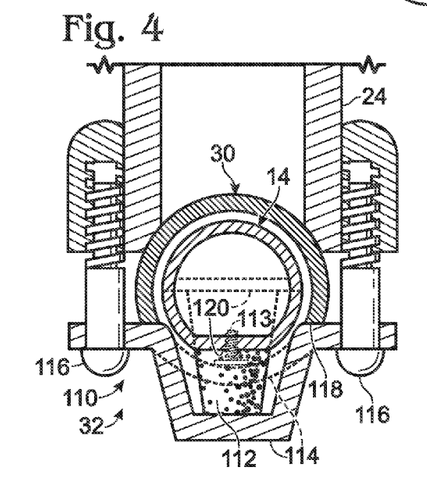
FIG. 4 is a cross-sectional view of a portion of the scooter of FIGS. 2-3, taken along line 4-4 in FIG. 2.
Figure 5:
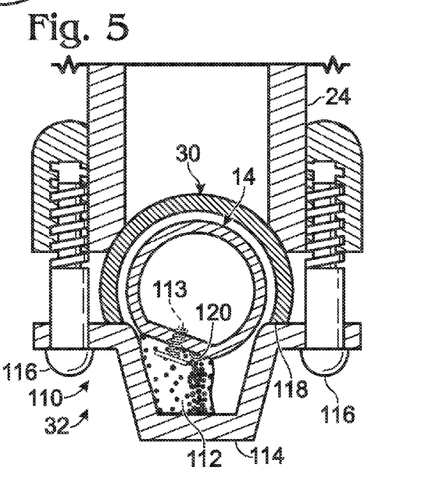
FIG. 5 is a cross-sectional view of the portion of FIG. 4, with the steering shaft in a right-turn configuration, and with the view generally corresponding to the view of FIG. 4.

Scooter 100 also provides an example of a scooter 10 having a steering stabilizer 32 that also includes dampening properties. The illustrative, non-exclusive example of steering stabilizer 32 of scooter 100 is indicated generally at 110 in FIGS. 2-5. As perhaps best seen in the exploded illustration of FIG. 3, steering stabilizer 110 includes an elastomeric member 112, a bracket, or cap, 114, and a pair of fasteners 116 that secure the cap to the connecting member 24 of the body of the scooter. The steering stabilizer also is partially defined by an opening 118 in the front portion of head tube 30 and an engagement surface 120 on the front of steering shaft 14. More specifically, the elastomeric member is captured between the engagement surface of the steering shaft and the cap, with the fasteners fixedly securing the cap to the body of the scooter and thus fixedly securing the cap relative to the head tube. The elastomeric member 112 additionally or alternatively may be described as an elastomeric spacer, dampener, spring, and/or bushing. In FIGS. 4-5, an optional fastener 113 is shown, securing the elastomeric member to the engagement surface 120 of the steering shaft. The illustrated fastener is in the form of a screw; however, any suitable fastener, including adhesive, may be used. Moreover, a fastener is not required to all embodiments, and the elastomeric member simply may be held in place with cap 114.

With reference to FIGS. 4-5, FIG. 4 illustrates the steering shaft 14 in a neutral steering position, and thus with the elastomeric member 112 in a non-deformed configuration, and FIG. 5 illustrates the steering shaft in a right-hand turn and with the elastomeric member 112 in a compressed, and restricted, configuration. If a rider were to rotate the steering shaft, such as from the neutral steering position illustrated in FIG. 4, to the right, such as to the position illustrated in FIG. 5, the rider would experience resistance as a result of the elastomeric member becoming compressed on its left side between the cap 114 and the engagement surface 120 of the steering shaft. This resistance may additionally or alternatively be described as a dampening of the steering movement or rotation of the steering shaft. Due to the internal bias of the elastomeric member, the steering shaft will return to the neutral steering position upon the rider releasing the steering shaft or at least decreasing the rotational force applied to the steering shaft, for example, via a gripping member, such as a handlebar.

In the illustrated example, the elastomeric member is frusto-conical in shape and is constructed of rubber or urethane; however, any suitable configuration and material of an elastomeric member is within the scope of the present disclosure. Moreover, as discussed herein, other configurations of steering stabilizers 32 are within the scope of the present disclosure, and scooters 10 are not limited to including a steering stabilizer having an elastomeric member. In the illustrated example, the engagement surface of the steering shaft extends forward of the longitudinal axis (which may be the steering axis) of the steering shaft. However, as indicated in dashed lines in FIG. 4, it is within the scope of the present disclosure that the engagement surface may be proximate or even intersect the longitudinal/steering axis of the steering shaft. Having the engagement surface intersect the longitudinal/steering axis of the steering shaft may permit the engagement surface to pivot with the steering shaft without translating (or translating as much) as would occur if the engagement surface is positioned forward of the longitudinal/steering axis. In such a configuration, it follows that the size and/or relative position of the elastomeric member and/or cap may be adjusted accordingly to maintain the elastomeric member in contact with the engagement surface to provide the dampening and/or restoring forces described herein. For example, with the engagement surface shown in dashed lines in FIG. 4, the cap may be reduced in size and/or not project as far away from the steering shaft, as also indicated in dashed lines.

Figure 6:
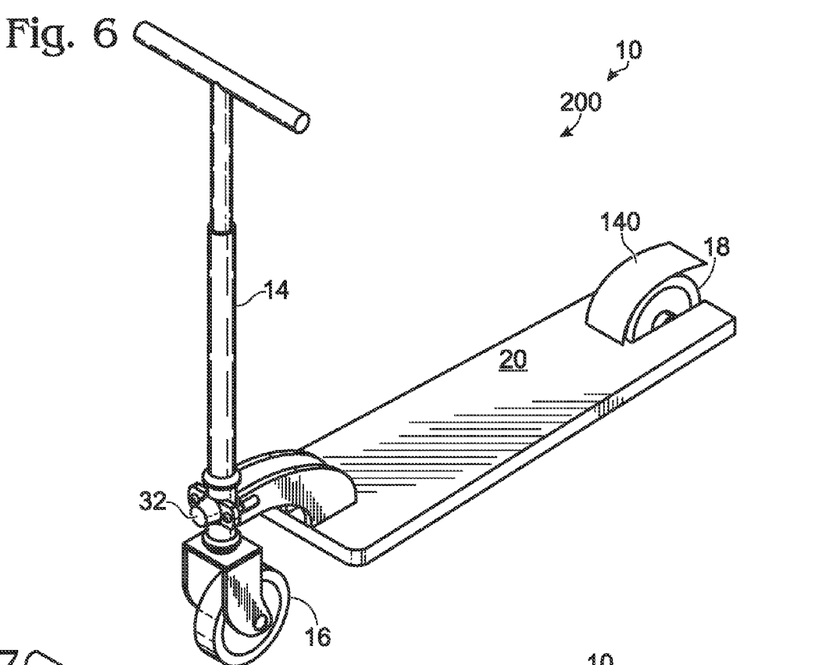
FIG. 6 is a perspective view of an illustrative, non-exclusive example of a scooter according to the present disclosure.

Another illustrative, non-exclusive example of a scooter 10 according to the present disclosure is illustrated in FIG. 6 and is indicated generally at 200. Scooter 200 is an example of a scooter 10 having a single rear wheel 18 and a single front wheel 16, with the front wheel having an axis of rotation that is positioned behind the axis of rotation of the steering shaft. Scooter 200 also includes a steering stabilizer 32. Scooter 200 also provides an illustrative, non-exclusive example of a scooter with a rider platform 20 that extends between the front and rear wheels and at least partially below the level of the top (uppermost portion) of the front and rear wheels.

Also shown in FIG. 6 is an optional brake assembly 140, which is configured to slow, or brake, the rotation of at least one of the scooter's wheels when the brake assembly is actuated. In FIG. 6, the brake assembly may be described as being a foot-actuated brake, or foot-actuated brake assembly, in that it is positioned proximate the rear wheel assembly in a location where a rider may actuate the brake assembly by pressing upon the brake assembly with one of the rider's feet. It is within the scope of the present disclosure that any of scooters 10 may include a brake assembly, and when present, the brake assembly may be configured to selectively (i.e., when actuated) slow the rotation of the scooter's front and/or rear wheels. Illustrative, non-exclusive examples of brake mechanisms that may be used with scooters having at least a rear wheel assembly that includes a truck are disclosed in U.S. Pat. No. 7,597,333, the disclosure of which is hereby incorporated by reference. Still further illustrative, non-exclusive examples include brake assemblies that include an actuator that is coupled to the scooter's handlebars or other gripping region and which is designed to be actuated by a user's hand.

Figure 7:
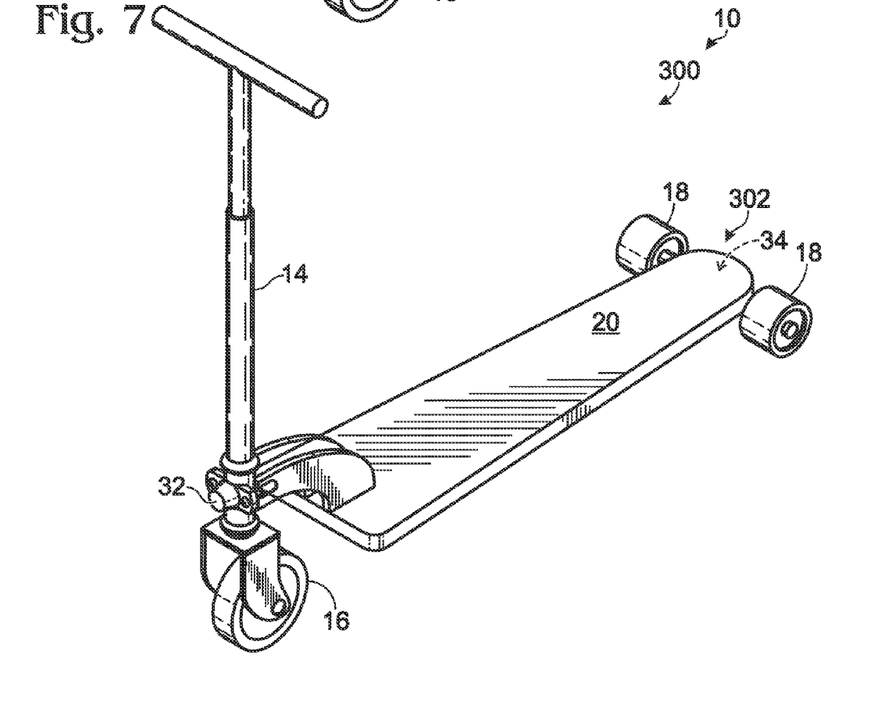
FIG. 7 is a perspective view of another illustrative, non-exclusive example of a scooter according to the present disclosure.

Yet another illustrative, non-exclusive example of a scooter 10 according to the present disclosure is illustrated in FIG. 7 and is indicated generally at 300. Scooter 300 is an example of a scooter 10 having a single front wheel 16, whose axis/axle of rotation (and contact with the ground surface) is positioned behind the axis of rotation of the steering shaft, and a pair of rear wheels 18, with the rear wheels being components of a rear wheel assembly 302 that includes a truck 34. Scooter 300 also includes a steering stabilizer 32.

Figure 8:
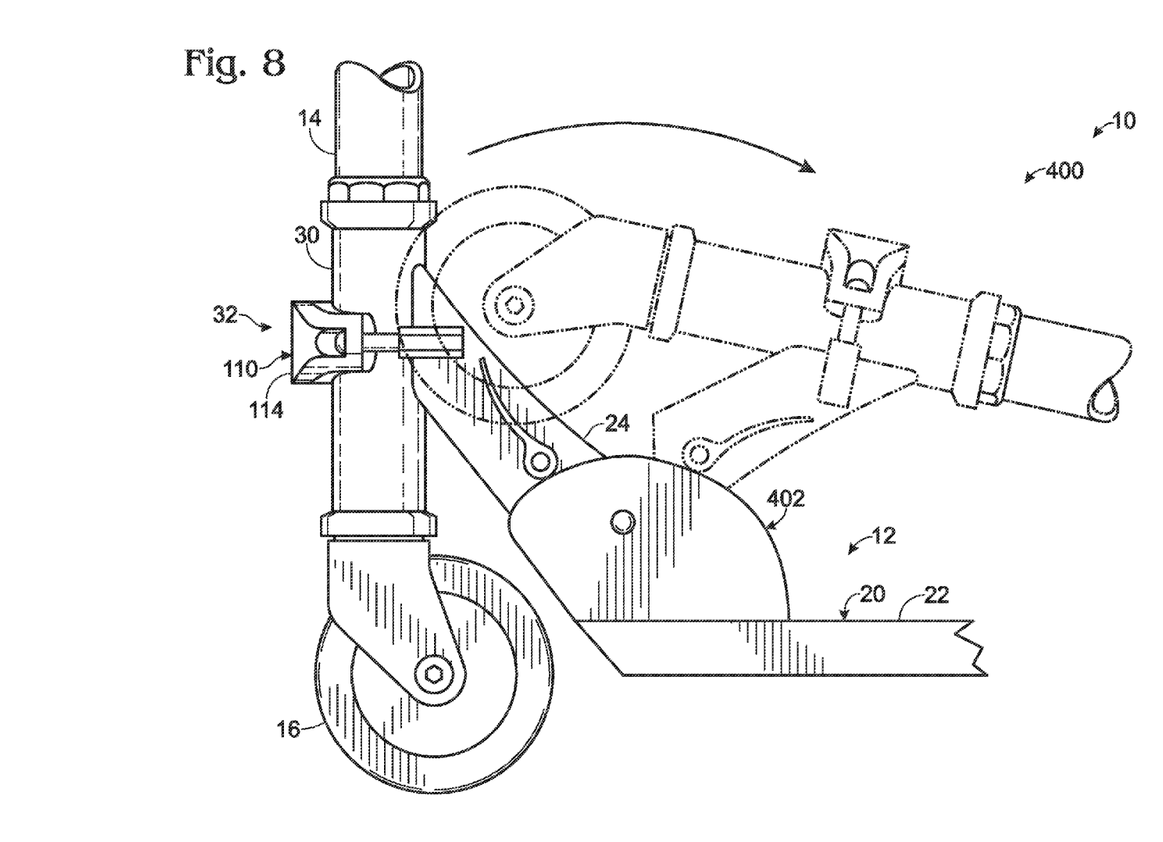
FIG. 8 is a fragmentary side view of a portion of another illustrative, non-exclusive example of a scooter according to the present disclosure.

Still another illustrative, non-exclusive example of a scooter 10 according to the present disclosure is shown in FIG. 8 and is indicated generally at 400. Scooter 400 is an example of a scooter 10 having a single front wheel 16, whose axis/axle of rotation (and contact with the ground surface) is positioned behind the axis of rotation of the steering shaft, a steering stabilizer 32 with the general form and structure (but different appearance/design) of steering stabilizer 110 of FIGS. 3-5, and a platform 20 with a riding surface 22 that extends below the level of the top of the front wheel. Scooter 400 also includes an optional pivot assembly 402, which permits the rider platform to be selectively pivoted toward the steering shaft, for example, to permit a rider to fold the scooter for storage.

Illustrative, non-exclusive examples of scooters according to the present disclosure are described in the following enumerated paragraphs.

A. A scooter, comprising:
a body, wherein the body includes a rider platform having an upper surface configured for a rider to stand on with one foot while kicking, or pumping, or otherwise contacting a ground surface with the rider's other foot;
at least one rear wheel supported by the body; and
at least one front wheel pivotally coupled relative to the body about a steering axis.

A1. The scooter of paragraph A, further comprising:
a shaft coupled to the body for engagement by the rider's hands.

A1.1. The scooter of paragraph A1, wherein the shaft is coupled to the at least one front wheel, is rotatingly coupled relative to the body, and is configured to rotate about the steering axis.

A1.2. The scooter of paragraph A1, wherein the shaft is fixed relative to the body and does not rotate relative to the body.

A1.3. The scooter of any of paragraphs A1-A1.2, wherein the shaft forms a portion of a steering assembly that includes a gripping member that is configured to receive steering inputs from the rider standing on the scooter's rider platform.

A1.4. The scooter of any of paragraphs A1-A1.3, wherein the gripping member includes a hand grip configured to receive steering inputs from at least one of the rider's hands.

A1.5. The scooter of any of paragraphs A1-A1.4, wherein the gripping member includes a handlebar configured to receive steering inputs from at least one of the rider's hands.

A2. The scooter of any of paragraphs A-A1.5, further comprising:
a steering stabilizer configured to limit an angle of pivot of the at least one front wheel relative to a neutral steering position, wherein the neutral steering position corresponds to the at least one front wheel having a rolling direction generally aligned with a long axis of the body of the scooter, and optionally wherein the angle of pivot is limited to less than 80 degrees.

A2.1. The scooter of paragraph A2, wherein the steering stabilizer is further configured to dampen the pivoting of the at least one front wheel about the steering axis.

A2.2. The scooter of any of paragraphs A2-A2.1, wherein the steering stabilizer is further configured to bias the at least one front wheel toward the neutral steering position.

A3. The scooter of any of paragraphs A-A2.2, further comprising a steering dampener configured to dampen the pivoting of the at least one front wheel.

A3.1. The scooter of paragraph A3, wherein the steering dampener is further configured to bias the at least one front wheel toward a neutral steering position, wherein the neutral steering position corresponds to the at least one front wheel having a rolling direction generally aligned with the long axis of the body of the scooter.

A4. The scooter of any of paragraphs A-A3.1, wherein an axis of rotation of the at least one front wheel is positioned behind, or rearward of, the steering axis.

A5. The scooter of any of paragraphs A-A4, wherein the at least one front wheel is mounted on an axle that is positioned behind the steering axis.

A6. The scooter of any of paragraphs A-A5, wherein at least when the front wheel is in a neutral steering position, the at least one front wheel contacts the ground surface rearward of a point where the steering axis intersects the ground surface; wherein the neutral steering position corresponds to the at least one front wheel having a rolling direction generally aligned with a long axis of the body of the scooter.

A7. The scooter of any of paragraphs A-A6, wherein the rider platform extends at least partially, and optionally completely, between the at least one front wheel and the at least one rear wheel.

A8. The scooter of any of paragraphs A-A7, wherein the rider platform extends at least partially, and optionally completely, below the level of the top of the at least one front wheel and the level of the top of the at least one rear wheel.

A9. The scooter of any of paragraphs A-A8, wherein the upper surface extends at least partially, and optionally completely, below the level of the top of the at least one front wheel and the level of the top of the at least one rear wheel.

A10. The scooter of any of paragraphs A-A9, wherein the at least one rear wheel includes at least two rear wheels, and optionally wherein the at least two rear wheels are pivotally supported by the body, and further optionally wherein the at least two rear wheels are biased toward a neutral steering position.

A10.1. The scooter of paragraph A10, further comprising: a truck upon which the at least two rear wheels are mounted to form a rear wheel assembly.

A11. The scooter of any of paragraphs A-A10.1, wherein the steering axis extends from the at least one front wheel upwardly and divergently away from the rider platform, and optionally wherein the steering axis projects forward of the rider platform.

A12. The scooter of any of paragraphs A-A10.1, wherein the scooter is configured to be steered by the rider in one or more of, and optionally two or more of, and still further optionally all of, the following manners:
  by the rider leaning to the left or right on the upper surface of the rider platform relative to the ground surface;
  by the rider pivoting the shaft to the left or right relative to the ground surface (when depending from paragraph A1); and/or
  by the rider rotating the shaft relative to the body about the steering axis (when depending from paragraph A1.1).

B. A scooter, comprising:
  a body, wherein the body includes a rider platform having an upper surface configured for a rider to stand on with one foot while contacting a ground surface with the rider's other foot;
  at least one rear wheel supported by the body;
  at least one front wheel pivotally coupled relative to the body about a steering axis, wherein an axis of rotation of the at least one front wheel is positioned rearward of the steering axis; and
  a steering dampener configured to dampen the pivoting of the at least one front wheel and to bias the at least one front wheel toward a neutral steering position.

B1. The scooter of paragraph B, including the subject matter of any of paragraphs A-A12.

C. A scooter, comprising:
  a body, wherein the body includes a rider platform having an upper surface configured for a rider to stand on with one foot while contacting a ground surface with the rider's other foot;
  at least one rear wheel supported by the body;
  at least one front wheel pivotally coupled relative to the body about a steering axis; and
  an upright steering shaft coupled to the at least one front wheel, rotatingly coupled relative to the body, and configured to rotate about the steering axis, wherein the steering shaft is positioned for engagement by the rider's hands;
  wherein the scooter is configured to be steered by the rider in the following three manners:
    by the rider leaning to the left or right on the upper surface of the rider platform;
    by the rider pivoting the steering shaft to left or right relative to the ground surface; and
    by the rider rotating the steering shaft about the steering axis.

C1. The scooter of paragraph C, including the subject matter of any of paragraphs A-A12.

D. A scooter comprising:
  a body, wherein the body includes a rider platform having an upper surface configured for a rider to stand on with one foot while contacting a ground surface with the rider's other foot;
  a rear truck;
  at least one front wheel pivotally supported relative to the body about a steering axis, wherein an axis of rotation of the at least one front wheel is positioned rearward of the steering axis; and
  means for biasing the at least one front wheel toward a neutral steering position.

D1. The scooter of paragraph D, further comprising:
  a head tube supported by the body, wherein the head tube defines an opening; and
  a steering shaft coupled to the at least one front wheel, extending through the head tube, rotatingly coupled relative to the head tube, and configured to rotate about the steering axis, wherein the steering shaft is positioned for engagement by the rider's hands, and wherein the steering shaft includes a flat surface adjacent the opening;
  wherein the means for biasing includes an elastomeric member engaged with the flat surface and a cap coupled to the head tube and that captures the elastomeric member between the cap and the flat surface.

D2. The scooter of any of paragraphs D-D1, including the subject matter of any of paragraphs A-A12.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, sized, implemented, utilized, programmed, and/or designed for the purpose of performing the function. It is within the scope of the present disclosure that elements, components, and/or other recited subject matter that is recited as being adapted to perform a particular function may additionally or alternatively be described as being configured to perform that function, and vice versa. It is also within the scope of the present disclosure that any system, component, and/or element that is disclosed herein as performing an action also may be described as being adapted, configured, selected, created, sized, implemented, utilized, programmed, and/or designed to perform the action.

INDUSTRIAL APPLICABILITY

The scooters presented herein are applicable to the sporting and recreational vehicle fields.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A scooter, comprising:
   a body, wherein the body includes a rider platform having an upper surface configured for a rider to stand on with one foot while contacting a ground surface with the rider's other foot;
   at least one rear wheel rotatingly coupled to the body;
   at least one front wheel rotatingly coupled to the body and pivotally coupled relative to the body about a steering axis, wherein an axis of rotation of the at least one front wheel is positioned rearward of the steering axis;
   a steering shaft coupled to the at least one front wheel and extending upwardly away from the at least one front wheel to a gripping member that is configured to be grasped by the rider standing on the rider platform during use of the scooter; and
   a steering stabilizer configured to bias the at least one front wheel toward a neutral steering position, wherein the steering stabilizer is further configured to dampen the pivoting of the at least one front wheel, and further wherein the steering stabilizer includes an elastomeric member that is configured to provide at least one of a biasing force that urges the at least one front wheel toward the neutral steering position and a dampening force that dampens the pivoting of the at least one front wheel.

2. The scooter of claim 1, wherein the steering stabilizer includes an elastomeric member that is configured to provide both of a biasing force that urges the at least one front wheel toward the neutral steering position and a dampening force that dampens the pivoting of the at least one front wheel.

3. The scooter of claim 1, wherein the steering axis projects from the at least one front wheel upwardly and divergently away from the rider platform.

4. The scooter of claim 1, wherein the scooter is configured to be steered by the rider in the following manners:
   by the rider leaning to the left or right on the upper surface of the rider platform;
   by the rider pivoting the steering shaft to the left or right relative to the ground surface; and
   by the rider rotating the steering shaft relative to the body about the steering axis.

5. The scooter of claim 1, wherein the steering shaft is pivotally coupled relative to the body and configured to pivot about the steering axis.

6. The scooter of claim 1, wherein the steering shaft is a fixed shaft that is fixed relative to the body and not coupled for pivoting about the steering axis.

7. The scooter of claim 1, wherein the steering stabilizer is further configured to limit an angle of pivot of the at least one front wheel relative to the neutral steering position.

8. The scooter of claim 7, wherein the angle of pivot is limited to less than 80 degrees to the left and less than 80 degrees to the right of the neutral steering position.

9. The scooter of claim 1, wherein the axis of rotation of the at least one front wheel is positioned rearward of the steering axis by a distance of at least 1.5 cm.

10. The scooter of claim 1, wherein the upper surface of the rider platform extends at least partially between the at least one front wheel and the at least one rear wheel.

11. The scooter of claim 1, wherein the upper surface of the rider platform extends completely below the level of the top of the at least one front wheel and the level of the top of the at least one rear wheel.

12. The scooter of claim 1, wherein the at least one rear wheel includes at least two rear wheels, wherein the at least two rear wheels are pivotally supported by the body, and wherein the at least two rear wheels are biased toward a neutral steering position of the at least two rear wheels.

13. The scooter of claim 12, further comprising:
a truck, upon which the at least two rear wheels are mounted to form a rear wheel assembly.

14. A scooter comprising:
a body, wherein the body includes a rider platform having an upper surface configured for a rider to stand on with one foot while contacting a ground surface with the rider's other foot;
at least one rear wheel rotatingly coupled to the body;
at least one front wheel rotatingly coupled to the body and pivotally coupled relative to the body about a steering axis, wherein an axis of rotation of the at least one front wheel is positioned rearward of the steering axis by at least 1.5 cm;
a head tube supported by the body, wherein the head tube defines an opening; and
a steering shaft coupled to the at least one front wheel, extending through the head tube, rotatingly coupled relative to the head tube, and configured to rotate about the steering axis, wherein the steering shaft is positioned for engagement by the rider's hands, and wherein the steering shaft includes an engagement surface adjacent the opening; and
means for biasing the at least one front wheel toward a neutral steering position, wherein the means for biasing includes an elastomeric member engaged with the engagement surface and a cap that is coupled to the head tube and that captures the elastomeric member between the cap and the engagement surface.

15. The scooter of claim 14, further comprising:
means for limiting an angle of pivot of the at least one front wheel relative to the neutral steering position to less than 80 degrees to the right of the neutral steering position and less than 80 degrees to the left of the neutral steering position.

16. The scooter of claim 14, wherein the engagement surface extends forward of the steering axis, and thus closer to the cap than the steering axis.

17. The scooter of claim 14, wherein the steering axis intersects the engagement surface.

18. The scooter of claim 14, wherein the steering axis projects from the at least one front wheel upwardly and divergently away from the rider platform.

19. The scooter of claim 14, wherein the scooter is configured to be steered by the rider in the following manners:
by the rider leaning to the left or right on the upper surface of the rider platform;
by the rider pivoting the steering shaft to the left or right relative to the ground surface; and
by the rider rotating the steering shaft relative to the body about the steering axis.

20. The scooter of claim 14, wherein the axis of rotation of the at least one front wheel is positioned rearward of the steering axis by a distance of at least 1.5 cm.

21. The scooter of claim 14, wherein the at least one rear wheel includes at least two rear wheels, wherein the at least two rear wheels are pivotally supported by the body, and wherein the at least two rear wheels are biased toward a neutral steering position of the at least two rear wheels.

22. The scooter of claim 21, further comprising:
a truck, upon which the at least two rear wheels are mounted to form a rear wheel assembly.

* * * * *